United States Patent [19]

Tomic

[11] 4,174,227

[45] Nov. 13, 1979

[54] HIGH-EARLY-STRENGTH PHOSPHATE GROUTING SYSTEM FOR USE IN ANCHORING A BOLT IN A HOLE

[75] Inventor: Ernst A. Tomic, Wilmington, Del.

[73] Assignee: E. I. Du Pont de Nemours and Company, Wilmington, Del.

[21] Appl. No.: 926,701

[22] Filed: Jul. 25, 1978

[51] Int. Cl.$^2$ ............................................. C04B 19/00
[52] U.S. Cl. ..................................................... 106/85
[58] Field of Search ..................................... 106/65, 85

[56] References Cited

U.S. PATENT DOCUMENTS

| | | | |
|---|---|---|---|
| 2,852,401 | 9/1958 | Hansen et al. | 106/65 |
| 3,179,526 | 4/1965 | Dolph | 106/65 |
| 3,285,758 | 11/1966 | Limes et al. | 106/65 |
| 4,066,467 | 1/1978 | Rechter | 106/85 |

*Primary Examiner*—James Poer

[57] ABSTRACT

A grouting system for anchoring a reinforcing member in a hole at a pull strength level of at least about 175 kg/cm anchoring length within a hour, and usually within 5–10 minutes, includes a hardenable inorganic grouting composition containing an acidic oxy phosphorus compound, e.g., $H_3PO_4$ or $Al(H_2PO_4)_3$; a basic Group II or III metal compound capable of reacting with the oxy phosphorus compound in the presence of water to form a monolithic solid, e.g., magnesium oxide; water; and aggregate, e.g., sand. The basic compound preferably is combined with a liquid, e.g., a hydrocarbon, which is substantially nonreactive therewith to form a slush, and the slush is kept separate from an aqueous solution or mixture of the oxy phosphorus compound until use. Control of the surface area and content of the basic metal compound, the water content, and the aggregate content, as well as the ability of preferred trivalent salts of phosphoric acid to form a cross-linked polymeric network, are believed to contribute to the rapid attainment of high pull strength.

15 Claims, No Drawings

HIGH-EARLY-STRENGTH PHOSPHATE GROUTING SYSTEM FOR USE IN ANCHORING A BOLT IN A HOLE

BACKGROUND OF THE INVENTION

1. Field of the Invention

The present invention relates to an inorganic grouting system for use in a method of anchoring a reinforcing member in a hole, e.g., in a mine roof, wherein reactive inorganic components are introduced into a hole and allowed to react and harden therein around a reinforcing member so as to fix it firmly in the hole.

2. Description of the Prior Art

Anchor bolts are employed in various fields of engineering, for example, as strengthening or reinforcing members in rock formations and in structural bodies. The bolts are inserted into drill holes in the formation or body, and often are fixed or anchored therein, at their inner end or over substantially their entire length, by means of a reactive grouting composition which hardens around the bolt. When used in a mine roof, bolts grouted in this manner help significantly to prevent mine roof failure. Because unsupported rock strata have a tendency to move vertically and laterally, and this motion is what commonly causes the roof to fail, it is important that bolts be installed as soon as possible in a newly exposed roof and that the required strength provided by the hardening of the grouting composition be developed rapidly, e.g., in a matter of a few minutes, or within an hour or so, depending on the type of mine. Rapid hardening also contributes to the efficiency of the bolt installation operation.

As a practical matter, the hardening or setting time of a bolt-grouting composition must be sufficient to allow the reactive components thereof to be mixed and positioned around the bolt in the hole, e.g., at least about 15 seconds, depending on anchoring length, both in the case in which the components are delivered separately into the hole and combined therein and mixed, e.g., by the rotation of the bolt, as well as when the components are delivered into the hole in combined and mixed form either before or after bolt insertion. Beyond this necessary working time, the rate at which the composition approaches its ultimate strength should be as high as possible, e.g., it should attain about 80% of its pull strength in an hour or less, and the ultimate pull strength should be at least about 175 kilograms per centimeter of anchoring length. Thus the over-riding need in grouting systems for rock bolt anchoring is sufficient working time combined with a rapidly attained high ultimate pull strength.

Reactive compositions which have been used in rock bolt anchoring include inorganic cement mortars and hardenable synthetic resins, and these have been introduced into the drill holes through a feed pipe, or in cartridged form. Inorganic grouting systems are economically more attractive than resin-catalyst systems, and generally are not plagued with such problems as instability on storage as are resin-catalyst systems.

Copending U.S. patent application Ser. No. 830,473, filed Sept. 6, 1977, now U.S. Pat. No. 4,126,005, anchoring grouting system and method wherein an inorganic grouting composition has two separate components, one a slush or sludgy mass containing a particulate inorganic cement and a liquid which is nonreactive therewith, and the other containing a liquid which is reactive with the inorganic cement. In use, the two separate components are brought together and mixed, preferably in a hole, e.g., by the rotation of a reinforcing member, and the cement and reactive liquid allowed to react in the hole to form a hardened grout around the reinforcing member therein. The term "cement", as applied in the mentioned copending application, includes cements which set by hydration, e.g., Portland and high-alumina cements; and metal oxides, e.g., magnesium oxide, which set up rapidly when mixed with phosphoric acid or phosphate solutions.

The hardening reaction that occurs when magnesium oxide and phosphates are combined also has been employed for various other purposes, e.g. to produce a binder system for foundry aggregate or refractory materials, to patch or repair cracks in roadways, etc. In these systems the reactants have a low rate of reaction, and are characterized by a long setting time (long pot life or working time) and slow strength development, usually over a period of days. Long pot life allows the mixture of reactive components to be shaped, e.g., by casting, and permits the performance of large jobs with a single mix. For example, U.S. Pat. No. 3,923,534 discloses refractory compositions in which a magnesia of low reactivity (fused or hardburnt magnesia) is used as a setting agent in combination with water and a water-soluble aluminum phosphate binding agent for a refractory filler such as silica or alumina. The wet refractory composition is said to be useful in concrete mixes, as a mortar or grouting, or as a castable composition. Low-reactivity magnesia is used in a minor amount relative to the aluminum phosphate, and the binding agent is a complex phosphate containing aluminum and phosphorus in a 1/1 ratio. These compositions set in hours or even days, allowing large mixes to be used but consequently providing no significant supportive strength over such periods. In addition to lacking early strength, the described compositions develop very little mechanical strength on standing at room temperature even for several days after setting, and require heating, for example, heating in use, to attain a useful mechanical strength.

U.S. Pat. No. 3,923,525 relates to binder compositions for foundry aggregate, the binder system being obtained from an aluminum phosphate containing boron, an alkaline earth material, and water. The composition of the aggregate-binder foundry mix is such as to allow it to be molded or shaped and thereafter cured to form a porous self-supporting structure having good collapsibility and shake-out properties. Only a small amount of binder is used, generally less than about 10 percent, and frequently within the range of about 0.5 to about 7 percent, by weight, based on the weight of the aggregate. Most often, the binder content range by weight is from about 1 to about 5 percent of the aggregate weight. This is sufficient to allow the binder to be distributed on the aggregate particles, and the coated particles to be molded into the desired shape. These foundry mixes require 1 to 4 hours to cure, and the cured shapes are weak enough to be collapsible and readily broken down for removal from a casting.

The method of patching described in U.S. Pat. No. 3,821,006 employs a two-component system of an inert particulate aggregate such as sand and a reactive mixture of an acid phosphate salt and magnesium oxide particles of the "dead-burned" type. Acid phosphate salts disclosed are monoammonium phosphate, monosodium phosphate, and monomagnesium phosphate. None of the disclosed compositions made from these salts have the high early strengths required for rock bolt anchoring in mine roofs. For example, a composition made from monomagnesium phosphate is reported to have developed a compressive strength of only 29 kilograms per square centimeter after 2 hours, and 60 kilograms per square centimeter after 24 hours.

Ammonium phosphate as a binder for magnesium oxide is also described in U.S. Pat. Nos. 3,960,580, 3,879,209, and 3,285,758. The cements based on magnesium oxide and dry, solid monoammonium phosphate (or an aqueous solution of ammonium polyphosphates) of U.S. Pat. No. 3,960,580 contain an oxy-boron compound such as sodium borate to extend their setting time. The compressive strength of these cements even after 2 hours is low, and their maximum strength is not attained for many days. U.S. Pat. No. 3,879,209 describes a process for repairing roadways, etc. with a composition comprising a magnesia aggregate wetted with a solution of ammonium phosphate containing orthophosphates, pyrophosphate, and polyphosphates, the latter including tripolyphosphate and higher polyphosphates. This composition also develops strength slowly, i.e., over a period of days. The ammonium component is described as essential for this composition, as phosphorus oxide components alone, such as phosphorus pentoxide, are disclosed as not giving the desired results. The same ammonium phosphate solution is described in U.S. Pat. No. 3,285,758, which also mentions the unsuitability of phosphoric acid and magnesium phosphate as well.

German OLS No. 2,553,140 describes a process for producing a cement by reacting aqueous orthophosphoric acid with a chemical combination of oxides such as magnesium orthosilicate ($2MgO.SiO_2$). The cement compositions described have long setting times (9–90 minutes) and their compressive strengths are measured usually after one month.

At the present state of the art, certain oxide/phosphate compositions are known to react extremely rapidly. These contain high-surface-area magnesium oxide, and/or monoammonium phosphate. The reaction with phosphoric acid also has been reported to be extremely rapid. While rapid reaction of the components of a grouting composition for anchoring rock bolts is a desirable property (provided that the composition does not set before it can be mixed and emplaced), it is essential that the composition, as was mentioned above, develop high strength early and attain a high ultimate strength within a reasonable period of time, e.g., in an hour or so, to provide an umbrella of safety in a mine roof. The prior art does not describe or suggest oxide/phosphate grouting compositions that meet these requirements, e.g., compositions that permit sufficient time for emplacing and mixing yet attain a pull strength of at least about 175 kilograms per centimeter of anchoring length in an hour or less.

SUMMARY OF THE INVENTION

The present invention provides an improvement in a grouting system for use in a hole in combination with a reinforcing member wherein a hardened grout is formed around the reinforcing member in the hole by the reaction of the mixed components of a hardenable inorganic grouting composition, thereby anchoring the reinforcing member in the hole.

The improvement of the invention comprises a grouting composition comprising (a) an acidic reactive component comprising at least one acidic oxy phosphorus compound selected from the group consisting of phosphoric acids, e.g., $H_3PO_4$, anhydrides of phosphoric acids, e.g., $P_2O_5$, and salts of phosphoric acids with multivalent, preferably trivalent, metal cations, preferably $Al(H_2PO_4)_3$;

(b) a basic reactive component comprising at least one particulate basic compound of a Group II or Group III metal capable of reacting with the oxy phosphorus compound in the presence of water to form a monolithic solid, preferably an alkaline earth metal compound selected from the group consisting of magnesium oxide, magnesium hydroxide, magnesium silicate, magnesium aluminate, and calcium aluminate; and (c) an aqueous component; these components being present in or outside a hole in a separated condition such that any substantial hardening reaction between the basic and acidic components is prevented, and when present outside the hole being adapted to be delivered into the hole separately or in a freshly combined condition; the basic metal compound (s) having a particle surface area of about from 0.1 to 40, preferably less than about 30, square meters per gram and constituting about from 5 to 35 percent of the total weight of the grouting composition, with the proviso that when the surface area is less than 1 square meter per gram more than about 95 percent of the particles pass through a 200-mesh screen (U.S. Standard Sieve Series); the ratio of the moles of the basic metal compound(s) to the moles of phosphorus pentoxide on which the oxy phosphorus compound is based being in the range of about from 2/1 to 17/1; the amount of water present in the composition constituting about from 3 to 20 percent of the total weight of the grouting composition; a particulate aggregate being present in the composition in an amount such as to constitute about from 30 to 70 percent of the total weight of the composition; and the components, when mixed, reacting without the application of heat thereto to form a hardened grout having a pull strength of at least about 175 kilograms per centimeter of anchoring length within an hour.

Preferably, the acidic reactive component and at least a portion of the aqueous component are combined in the form of an aqueous solution or mixture of a phosphoric acid or a phosphoric acid salt, and this solution or mixture is kept separate from the basic reactive component until use.

Use of the reactive components in the form of a slush as in the grouting system described in the aforementioned U.S. Application Ser. No. 830,473 is desirable to achieve lubricity in the system for the easy insertion and rotation of a reinforcing member, and to make the component pumpable through small-diameter passageways. Hydrocarbons, polyols, and water are suitable slush-forming liquids.

DETAILED DESCRIPTION

When the components of the grouting composition used in the phosphate grouting system of the invention are combined and mixed, the reactive materials therein react rapidly around a reinforcing member to form a hardened grout of sufficient strength to firmly anchor the reinforcing member in a hole in rock strata so as to provide supportive strength to the strata. In quantitative terms, rapid reaction means that the grouting composition hardens in less than 30 minutes, usually in about 1–2 minutes, and reaches at least about 80% of its ultimate pull strength in less than 30–60 minutes, usually in less than 10 minutes. Firm anchorage means that the ultimate pull strength of the hardened grout is at least about 175 kilograms per centimeter of anchorage length.

The rapid attainment of high pull strength that characterizes the present phosphate grouting system depends on a unique combination of features of the grouting composition, including the surface area and content of the particulate basic metal compound (s) with respect to the total grouting composition and also with respect to the oxy phosphorus compound (s), the water content, the aggregate content, and, in a preferred case, the presence of an oxy phosphorus compound (trivalent metal salt of phosphoric acid) that forms a cross-linked polymeric network in the hardening reaction. The reactive entity in the acidic component is a phosphoric acid or an anhydride thereof, or an acid salt of a phosphoric acid with a multivalent, preferably trivalent, metal cation. This entity reacts with the reactive entity in the basic component which is a basic Group II or III metal compound that is capable of reacting with the phosphoric acid or an anhydride or salt thereof to form a monolithic solid. Such compounds include, for example, alkaline earth metal oxides and hydroxides, e.g., magnesium oxide, magnesium hydroxide, and calcium oxide; aluminum oxide and hydroxide; ferric hydroxide; alkaline earth metal aluminates, e.g., magnesium aluminate and calcium aluminate; and magnesium silicate. Magnesium oxide and hydroxide are preferred on the basis of availability. Aluminum oxide, e.g., $Al_2O_3 \cdot 3H_2O$, desirably is used in mixture with magnesium oxide or hydroxide, especially when the oxy phosphorus compound is phosphoric acid, $H_3PO_4$. With such mixtures, up to about 13% and preferably about from 5 to 7% of the grouting composition, is aluminum oxide.

When the acidic, basic, and aqueous components are combined and mixed, the phosphoric acid or phosphate reacts with the particulate basic metal compound in the presence of the water to form a hardened structure wherein the particles of aggregate and any unreacted portions of the particles of the basic metal compound are bound together. It has been found that monovalent salts of phosphoric acid, e.g., the ammonium phosphates which figure prominently in the prior art on patching systems, etc., do not develop the early pull strength required for bolt anchoring, and it is believed that this shortcoming is due, at least in part, to the inability of such salts to form a three-dimensional polymeric network crosslinked by a multivalent metal ion, e.g., $Al^{+3}$. For this reason, acid salts of phosphoric acids with trivalent metal cations, e.g., $Al^{+3}$, are preferred phosphoric acid salts in the acidic component especially with highly reactive magnesium oxides, e.g., "chemical grade" and to a lesser extent "calcined grade" oxides. Phosphoric acid (and $P_2O_5$), and acid aluminum salts thereof, especially the common aluminum dihydrogen phosphate and $AlH_3(PO_4)_2 \cdot H_3PO_4$, are most preferred.

In the present system, the grouting composition is in its pre-mixed form, and for this reason the acidic, basic and aqueous components are present in a separated state. Separation of these components is such that one component is excluded from the presence of the other two, which in turn may be together or also separate. In most cases, it will be more convenient, and therefore preferred, to have the phosphoric acid or phosphate present in its hydrous form, i.e., as an aqueous solution or slurry, and in such cases the combined acidic and aqueous components will be maintained separate from the basic component, which can also contain water and/or a nonaqueous liquid. Alternatively, a substantially anhydrous acidic component, e.g., one containing $P_2O_5$, can be combined with a substantially anhydrous basic component, and these combined components kept separate from the aqueous component; or the basic and aqueous components can be combined and kept separate from the substantially anhydrous acidic component. In both of the latter cases, the substantially anhydrous components can be slurries or slushes with nonaqueous liquids.

The particulate basic metal compound, e.g., magnesium oxide, has a surface area in the range of up to about 40 square meters per gram, and constitutes about from 5 to 35 percent of the total weight of the grouting composition. Grouts having less than about 5 percent of the basic metal compound do not develop a sufficiently high ultimate pull strength regardless of the setting time. A preferred minimum is about 8 percent. There appears to be no advantage in exceeding a basic metal compound content of about 35 percent, and on an economical basis more than about 25 percent generally will not be used. These percentages refer to the total of all such reactive basic metal compounds present.

The preferred basic metal compound has a surface area of less than about 30, and most preferably 1 to 20, square meters per gram. This means that the preferred magnesium oxide is the socalled "chemical grade" magnesium oxide, prepared by calcining magnesium carbonate at temperatures in the 900°–1200° C. range. Calcined-grade (surface area generally well below 1 m²/g) and fused (surface area below about 0.1 m²/g) magnesium oxide can be used taking the following consideration into account. For a given concentration of the basic metal compound, the selected surface area thereof should be sufficiently low to assure the necessary working time (e.g., about 15–45 seconds to allow insertion of a bolt into the grout and mixing), but sufficiently high to give a hardened grout of a desired strength in the desired time. Generally, this means that high concentrations are used with low surface areas and vice versa. With low-surface-area compounds, e.g., below about 1 square meter per gram, more than about 95 percent of the particles should pass through a 200-mesh screen (U.S. Standard Sieve Series) to assure an acceptable reaction rate.

High early strength also requires that the basic metal compound concentration be sufficiently high with respect to the amount of phosphoric acid (or its anhydride) or metal phosphate present in the acidic component. The molar ratio, for example, of the basic metal compound in the oxide form to the oxy phosphorus compound in the form of $P_2O_5$ should be at least about 2/1, preferably at least about 4/1. Generally, there is no advantage to exceeding this ratio to any large degree, e.g., above about 17/1, inasmuch as a cheaper filler can be used to increase the solids content without deleterious effect.

As was mentioned previously, a phosphoric acid or a metal phosphate preferably will be present in the hydrous form, i.e., as an aqueous solution or slurry, and in this embodiment the aqueous component will, at least in part, be found combined with the acidic component. In this case, the basic component must be maintained separate from the acidic component, and may or may not contain water.

Water is needed in the grouting composition so that the acidic oxy phosphorus compound will be in the form of a well-dispersed system which allows for mobility of ions. At least about 3 percent of the total weight of the grouting composition will be water, larger concentrations being used with compositions containing larger amounts of oxy phosphorus compound. However, the water content of the composition has to be controlled so as not to exceed about 20 percent by weight, or the rate of strength development will be deleteriously affected. Accordingly, the concentration of aqueous phosphoric acid or aqueous metal phosphate in the acidic component is at least about 60 percent by weight. This concentration can be much higher, e.g., when water is also present in the basic component. Supersaturated aluminum phosphate solutions and the solid-liquid mixtures which result when crystallization takes place from these metastable solutions are preferred over less concentrated solutions because they produce stronger grouts.

A particulate aggregate, preferably sand, is present in a controlled amount as a filler in the basic and/or acidic component of the grouting composition. Aggregate greatly enhances the strength of the hardened grout and also reduces the amount of particulate basic metal compound required. Other aggregrate materials which can be used include particles of competent rocks or rock-forming minerals such as granite, basalt, dolomite, andesite, feldspars, amphiboles, pyroxenes, olivine, gabbro, rhyolite, syenite, diorite, dolerite, peridotite, trachyte, obsidian, quartz, etc., as well as materials such as slag, cinders, fly ash, glass cullet, and fibrous materials such as chopped metal (preferably steel) wire, glass fibers, asbestos, cotton, and polyester and aramide fibers. Sands having different particle shapes and sizes can be used. Because of the need to be packed in a narrow annulus, the particles should have a minimum dimension no larger than about 3 mm. Mixtures of different aggregates also can be used.

For a given system, the shear strength of the hardened grout increases with increasing aggregate content up to about 60–70 percent by weight based on the total weight of the two components. At the same time, however, mixing of the components becomes increasingly difficult as the aggregate content increases. Also, too high an aggregate content, e.g., 90 percent or more based on the total weight of the grout, results in a friable, impact-sensitive product which is of no use for anchoring a reinforcing member in a hole. Therefore, while an aggregate content of up to about 80 percent can be employed, a content above about 70 percent is not preferred on the basis of ease of mixing and because there is little if any shear strength increase to be gained by exceeding 70 percent, usually at least about 30 percent, and preferably at least about 40 percent, of the total weight of the grouting composition will be aggregate.

The manner in which the aggregate is distributed between the reaction components has no significant effect on the shear strength of the hardened grout. Thus, 100 percent of the aggregate can be in the basic component or 100 percent in the component separated therefrom, usually the acidic component. Alternatively, the aggregate can be distributed in any other proportions, e.g., 1/1, between two separated components. The specific aggregate distribution in any given case usually will be selected on the basis of that which gives a desired viscosity balance and ease of mixing. In a system in which the components are pumped and mixed at the site of use, it may be more convenient to include the aggregate in only one of the components.

A preferred aggregate in the grouting composition is non-uniform or graded sand, i.e., sand having, in a size cut which includes 90 percent or more of the particles, maximum and minimum sizes that deviate by more than about 20 percent from the median particle size of the cut; and sand that is substantially free, and in any case contains no more than about 10, and preferably no more than about 5, percent by volume, of particles larger than about 600 microns. Such sand, described in co-pending Application Serial No. 830,474 filed Sept. 6, 1977, now U.S. Pat. No. 4,127,001, the disclosure of which is incorporated herein by reference, produces grouts having higher shear strengths than those made from compositions containing uniform sand.

Particulate materials in the grouting composition, e.g., the basic metal compound, aggregate, or the oxy phosphorus compound may be present in the dry state, as is shown in Example 17, but preferably they are present in the form of a solution, slurry, or slush with a liquid with which they are nonreactive to any substantial degree. If water is kept separate from the oxy phosphorus compound, the latter and any aggregate which may be combined therewith form a slurry or slush with a nonaqueous liquid, preferably a hydrocarbon. Preferably, however, in the acidic component, phosphoric acid or a metal phosphate is present in aqueous solution or as a slurry or slush with water, which slurry or slush may also contain aggregate. The basic metal compound and any aggregate present therewith preferably form a slurry or slush with a nonaqueous liquid such as a hydrocarbon or polyol, or with water or a water-containing liquid, water being used if the oxy phosphorus compound is separate from the basic metal compound and if the basic metal compound is sufficiently nonreactive with water that the basic component is not rendered resistant to bolt penetration by the occurrence of a hardening reaction therein. Magnesium oxide, for example, can be used in a slush with water or a water-containing mixture such as an aqueous glycol. A reaction may begin to take place between the oxide and water after some time depending on such factors as the calcination or fusion temperature of the oxide, the oxide/water ratio, oxide particle size, storage temperature, etc. This produces magnesium hydroxide, also a basic metal compound as defined herein for use in the basic reactive component. Thus, in a packaged system some change in the consistency of the basic component may be noted after a certain period of time, e.g., after about several hours to several days, when magnesium oxide and water are present therein, but this does not involve hardening to the degree that bolt penetration becomes difficult. Also in a system wherein a freshly made magnesium oxide/water component is pumped into a hole, bolt insertion and reaction with the acidic component would occur before hydration of the oxide. Thus, in the sense defined above, water is a substantially nonreactive slush-forming liquid for magnesium oxide.

Reactive components in the solution, slurry, or slush form have several advantages over dry components. First, lubricity is imparted to the components so that, when they are packaged in a compartmented cartridge, a bolt can be inserted into the cartridge easily and rapidly. Also, such components can be metered accurately and handled in compact pumps for ease of packaging in high-speed form-fill machinery as well as for on-site feed operations. In addition, such components are adapted to be delivered intermittently in relatively small quantitites as is required for bolt anchoring in holes.

A wide variety of liquids can be used as slush-forming liquids in the grouting composition. The specific choice in any given case will be made on the basis of the nature of the particulate ingredient, usually the basic metal compound, any effect the particular liquid may have on the setting and strength-development time, and the cost of the liquid. Liquid hydrocarbons and mixtures containing such hydrocarbons are particularly advantageous from the point of view of setting time as well as cost, and therefore are preferred. A substantially non-volatile liquid is preferred to assure stability under varying conditions of storage and use. For this reason, liquids boiling above about 25° C. at atmospheric pressure are preferred. Thus, preferred hydrocarbon slush-forming liquids are 5–25 carbon atom aliphatic hydrocarbons such as hexanes, heptanes, and octanes; and aromatic hydrocarbons such as benzene and alkyl benzenes, e.g., toluene and xylene. Aromatic or aliphatic hydrocarbon mixtures such as gasoline, naphtha, kerosene, paraffin oil, diesel fuel, fuel oils, lubricating oils, vegetable oils, e.g., linseed, tung, cottonseed, corn, and peanut oils, and crudes such as petroleum and shale oil also can be employed. For use in coal mines, the liquid in the slush must have a flash point above 38° C., and should be low in volatile aromatics.

Although low-viscosity slush-forming liquids are preferred, thick liquids such as medium- or high-viscosity process oils, asphalt, grease, e.g., hydrocarbon oils thickened with soaps or other viscosity modifiers; animal fats, e.g., lard; and hydrogenated vegetable oils also can be used alone or combined with lower-viscosity liquids.

The slush-forming liquid also can be an alcohol, e.g., methanol, isopropanol, butanol, secbutyl alcohol, amyl alcohol, a polyol such as glycol or glycerol; a ketone, e.g., acetone or methyl ethyl ketone; cellosolve; an ester, e.g., dibutyl phthalate or acetyl tributyl citrate; dimethyl sulfoxide; or dimethylformamide; but the setting time of grouts made from slushes with these compounds may be much longer than that from slushes with hydrocarbons.

From strength considerations, it is undesirable to exceed significantly the amount of slush-forming liquid required to give the necessary lubricity and deliverability (e.g., pumpability). A liquids/solids weight ratio of the combined components in the range of about from 0.1 to 0.6 is satisfactory from the viewpoint of strength, and handling and mixing considerations. In accordance with these considerations, the amount of slush-forming liquid will vary about from 5 to 50, preferably 8 to 20, percent of the total weight of the composition.

Inasmuch as the slush-forming liquid, e.g., a hydrocarbon, does not contribute to the strength of the grout, the amount thereof will be kept to a minimum, e.g., by the addition of one or more surface-active agents to an oil slush. About from 0.1 to 10, and preferably from 1 to 5, percent of the weight of the oil can be a surface-active agent, e.g., oleic acid, sorbitan monooleate and monolaurate, polyoxyethylene monooleate, and hexaoleate, polyoxyethylene sorbitan trioleate and monolaurate, and polyoxyethylene tridecyl ether. Of these, oleic acid is preferred both on the basis of degree of effectiveness and cost.

When the oxy phosphorus compound is phosphoric acid and the acidic reactive component and aqueous components are combined so as to contain an aqueous phosphoric acid solution, a thickening agent preferably is incorporated into the acidic component. This reduces the chance that liquid will run out of an upward-slanting hole or soak into fissures or pores in the hole wall. Also the thick liquid may impart a lubricating effect to the acidic reactive component, thereby facilitating the insertion of a bolt therein, which effect is especially advantageous when an aggregate is suspended in the liquid, the aggregate having less tendency to settle or pack in the thick liquid. Polyethylene oxides are preferred organic thickeners because of their stability in phosphoric acid systems. Inorganic thickeners such as fumed silica also are effective.

The amount of thickening agent in the acidic reactive component depends on the specific material used, and specifically on the degree of thickening of the acidic component attainable therewith, a function generally of the molecular weight and degree of substitution of an organic polymeric material, and depends also on other solid materials which may be incorporated in the acidic component. Generally, the amount of thickening agent will be in the range of about from 0.1 to 1, preferably to 0.5, percent of the total weight of the composition, the lower end of the range being used with materials of higher molecular weight.

The present grouting system can be used wherever structure reinforcement is required, e.g., in rock bolting or roof bolting in coal or metal mines, or to secure bolts in holes drilled in concrete structures. If the components of the system are delivered into the drill hole by pumping, they preferably are pumped into the hole separately and combined and mixed therein before or after bolt insertion. Alternatively, pumped components can be combined just outside the hole and mixed there or in the hole. Preferably the components of the grouting composition are delivered into the drill hole, and the reinforcing member is introduced into the composition before any substantial hardening of the composition has occurred, whereby grouting composition is forced into an annulus formed between the reinforcing member and the wall of the hole. The components are thereafter mixed, preferably by the rotation of the reinforcing member, to form the hardened grout. A preferred system comprises a frangible compartmented package having at least two components in separate compartments, the package being broken by penetration by the reinforcing member.

The invention will now be illustrated by way of the following examples. Parts are by weight.

EXAMPLE 1

A grouting composition was prepared which had the following components:

| Basic Component | Acidic and Aqueous Components |
|---|---|
| 13.2% MgO | 18.5% aqueous Al(H$_2$PO$_4$)$_3$ solution |
| 35.9% Sand | 21% Sand |
| 11.4% Circosol 304* (containing 2.5% oleic acid surfactant) | |

*A naphthenic petroleum oil manufactured by the Sun Oil Company

The percentages are present of the ingredients by weight, based on the total combined weight of the components. The magnesium oxide had a surface area of 5.7 square meters per gram. The sand was Ottawa Silica Company's Banding Sand. This sand has round particles, 94% of which are in the size range of 74 to 210 microns, and 99% of which are smaller than 420 microns.

The composition of the aluminum phosphate solution, by weight, was 11.5% $Al_2O_3$, 47.7% $P_2O_5$, and 40.8% $H_2O$.

The basic component (234 parts) was introduced into one compartment, and the acidic and aqueous components (151 parts) into the other compartment, of a two-compartment frangible "chub" cartridge such as that described in U.S. Pat. Nos. 3,795,081 and 3,861,522, the cartridge being made of polyethylene terephthalate film. In the sealed compartmented cartridge, which was 41 centimeters long and 2.3 centimeters in diameter, the basic component and acidic/aqueous component was maintained separate from one another. The cartridge was cooled to 10° C. (to simulate the average temperature in a mine) and placed in a 41-cm-long, 2.54 cm-inner-diameter steel pipe having a rough wall (coarse threads) and a welded closure at one end (simulated drill hole). The pipe was held in an upright position in the vise of a Mayo machine with the closed end uppermost. The Mayo machine is one which is commonly used in mines to drill holes into mine ceilings and to install roof bolts for grouting. A 61-cm-long reinforcing rod (bolt) having a diameter of 2 cm also was mounted in the Mayo machine. Both the pipe (drill hole) and the bolt were at 10° C.

Upon actuation of the machine, the rod was inserted into the cartridge with an upward motion at a speed of 6 meters per minute at 400 rpm. During insertion the bolt broke the polyethylene terephthalate film. After the bolt reached the closed end of the pipe, the bolt was spun for 35 seconds and completed mixing of the initially separated components.

Five minutes after the bolt installation had been completed, the pull strength of the hardened grout was measured by applying an increasing force to the headed end of the bolt in a downward direction. The bolt broke at a load of $15.5 \times 10^3$ kg. Therefore, the grout supported a load of more than 378 kg per centimeter of anchoring length and exceeded the steel bolt in strength.

EXAMPLE 2

The procedure described in Example 1 was repeated except that the magnesium oxide content of the grouting composition was 17%, sand 31.5% in basic, 15.3% in acidic, component, Circosol 12.7% and aluminum phosphate solution 23.6% and the magnesium oxide surface area was 10 square meters per gram. The chub cartridge was 51 cm long, and contained 201 parts of the basic component and 128.5 parts of the acidic/aqueous component. In this case, after five minutes, the bolt broke at a load of $21.8 \times 10^3$ kg, the grout having supported a load of more than 427 kg per centimeter of anchoring length.

EXAMPLE 3

A grouting composition was prepared which had the following components:

| Basic Component | Acid and Aqueous Components |
|---|---|
| MgO (43.62 parts) | 74% aqueous solution |
| $Al_2O_3 \cdot 3H_2O$ (23.44 parts) | of $H_3PO_4$ (32.8 parts) |
| Circosol 304 (32.12 parts) | Sand (67.12 parts) |
| | Polyethylene oxide (0.08 part) |
| Oleic Acid (0.82 part) | |

The surface area of the magnesium oxide was 10 $m^2/g$. The sand was the same as that described in Example 1. The polyethylene oxide, which served as a thickener for phosphoric acid, was Polyox 301, having a molecular weight of about 4,000,000.

The composition was loaded into a cartridge and tested as described in Example 1. The two-component cartridge contained 82.5 parts of the basic component and 199.5 parts of the acidic/aqueous component. The bolt was inserted into the cartridge at a speed of 3 meters per minute and a thrust of 454 kg. and mixed at a torque of 68 Newton meters. The total time required for bolt insertion and mixing was 25–27 seconds. In the 5-minute pull test, the bolt broke at a load of $15.2 \times 10^3$ kg, the grout having supported a load of more than 372 kg per centimeter of anchoring length.

EXAMPLE 4

The effect of the surface area of magnesium oxide particles on the rate of hardening of a given grouting composition is shown in a series of experiments made with a composition containing 13% MgO, 7% $Al_2O_3 \cdot 3H_2O$, 10% Circosol 304, 23% $H_3PO_4$ (74% aqueous solution), and 47% sand, the basic component containing the MgO, $Al_2O_3 \cdot 3H_2O$, oil, and sand in an amount which was 20% of the total weight of the composition; and the acidic/aqueous component containing the $H_3PO_4$ solution and the remainder of the sand. The composition was tested for 5-minute pull strength as described in Example 1.

| MgO Surface Area ($m^2/g$) | Pull Strength (kg/cm) |
|---|---|
| 1.1 | 0 |
| 2.6 | 129 |
| 4.4 | 243 |
| 5.6 | 393 |
| 6.5 | 643 |
| 10 | 821 |

Thus, at the 13% MgO concentration level, grouts having MgO surface areas below 4.4 $m^2/g$ required longer than 5 minutes to attain strength levels of 175 kg/cm. Above 10 $m^2/g$, the setting rates were so high, adequate mixing of the components could not be accomplished.

EXAMPLE 5

The following experiments show that a composition having a small surface area MgO and low setting rate can have its setting rate increased by increasing the MgO concentration. The experiments were carried out on the composition described in Example 1 except that the MgO content was varied, the difference in the MgO content from that in Example 1 having been reflected in a proportionate decrease or increase in the sand content of the basic component described in Example 1.

| % MgO | 5-Min Pull Strength (kg/cm) |
|---|---|
| 10 | 250 |
| 11.6 | 321 |
| 16 | 536 |
| 18 | 786 |

When the composition described in Example 1 was made with MgO having a surface area of 1.1 m²/g, the 5-minute pull strength was 0 kg/cm, but at a MgO level of 25%, the composition had a 5-minute pull strength of 786 kg/cm.

EXAMPLE 6

A grouting composition was prepared which had the following components:

| Basic Component | Acidic and Aqueous Components |
|---|---|
| 18.0% MgO | 18% aqueous $Al(H_2PO_4)_3$ solution |
| 35.6% Sand | 20% Sand |
| 8.4% Circosol* | |

*A mixture of 48.75% Circosol 450, 48.75% Circosol 4240, and 2.5% oleic acid.

The MgO was of the dead-burned type, having a surface area of 0.8 m²/g, and a median particle size of 6 microns.

When cartridged and tested according to the procedure described in Example 1 (30 second mix time after installation; bolt insertion at 1000 kg thrust and mixing at 163 Newton meters torque), the 5 minute pull strength was 317 kg/cm.

EXAMPLE 7

The following grouting compositions were prepared:

| A | B |
|---|---|
| Basic Component | Basic Component |
| 13% MgO (10 m²/g) | 15.4% MgO (10 m²/g) |
| 10% Oil containing 2.5% oleic acid | 8.3% $Al_2O_3 \cdot 3H_2O$ |
| 27% Sand | 11.8% Oil |
|  | 23.7% Sand |
| Acidic/Aqueous Component | Acidic/Aqueous Component |
| 23% aq. $H_3PO_4$ (74%) | 18.9% aq. $H_3PO_4$ (74%) |
| 27% Sand | 21.9% Sand |

Both compositions were tested as described in Example 1, except that the pipe and bolt lengths were 12.7 cm. Mixing time after the bolt was in place was 30 seconds. With Composition A, the hardened grout, after five minutes, supported a load of up to 786 kg/cm and then failed. Composition B supported more than 857 kg/cm.

EXAMPLES 8–11

The effect of the water content of the grouting composition (or the concentration of the $Al(H_2PO_4)_3$ solution) is shown in a series of experiments made with a composition containing 13% MgO, 10.4% Circosol, 57.9% sand, and 18.7% $Al(H_2PO_4)_3$ solution of different concentrations.

| Ex. | $Al(H_2PO_4)_3$ soln. % $Al(H_2PO_4)_3$ | $H_2O$ | % Water in Grouting Compn. | 5-Min Pull Strength (kg/cm) |
|---|---|---|---|---|
| 8 | 71.6 | 28.4 | 5.3 | 714 |
| 9 | 69.7 | 30.3 | 5.7 | 393 |
| 10 | 67.3 | 32.7 | 6.1 | 321 |
| 11 | 47.6 | 52.4 | 9.8 | 71 |

EXAMPLES 12–16

Five different compositions were prepared using an approximately 70% aqueous $Al(H_2PO_4)_3$ solution (11.2% $Al_2O_3$ and 46.8% $P_2O_5$) in the acid/aqueous component. In all cases, 61-cm-long, 2-cm-diameter bolts were installed into the grout as described in Example 1 and pull-tested 5–10 minutes after installation. Compositions, mole ratios, and pull strengths are tabulated below:

|  | Ex. 12 | Ex. 13 | Ex. 14 | Ex. 15 | Ex. 16 |
|---|---|---|---|---|---|
| % MgO | 8.9 | 13.9 | 17.0 | 21 | 23 |
| MgO Surface Area, m²/g | 20 | 15 | 10 | ~1 | ~1 |
| % Oil* | — | — | 12.7 | 12.4 | 13.5 |
| % Glycol** | 7.9 | 11.4 | — | — | — |
| % Sand | 56.0 | 56.7 | 46.8 | 49.1 | 53.6 |
| % $Al(H_2PO_4)_3$ Soln. (70%) | 27.2 | 18 | 23.6 | 17.5 | 10 |
| Moles MgO/$P_2O_5$ | 2.45 | 5.7 | 5.4 | 9.0 | 17.3 |
| Pull Strength (kg/cm) | 242 | 280 | 357 | 280 | 182 |

*Circosol containing 2.5% oleic acid; in basic component
**In basic component

EXAMPLES 17–22

Grouting compositions wherein oil was not present as a slush-forming liquid for the basic metal compound were prepared and tested as described in Example 1. Details of the compositions and test results are given in the following table:

| | Basic Component | | | Acidic/Water Component | | 5-Min. Pull Test | |
|---|---|---|---|---|---|---|---|
| Ex. | Metal Compd.* | Sand* | Slush-Forming Liquid* | Oxy Phosphorus Compd.* | Sand* | Conditions | Result |
| 17 | 16.4% MgO (~15m²/g) | none | none | 29.4% aq. $Al(H_2PO_4)_3$ soln.(a) | 54.2% | 43-cm cartridge weighing 347.9 g; 61 cm × 2 cm bolt: 1000 kg thrust, 300 rpm, 6 meters/min | 371 kg/cm |
| 18 | 12.8% MgO (5.7 m²/g) | 38.3% | 8.5% water | 23.4% aq. $Al(H_2PO_4)_3$ | 17.0% | 13 cm × 2 cm bolt; mixed | 357 kg/cm |

-continued

| | Basic Component | | | Acidic/Water Component | | 5-Min. Pull Test | |
|---|---|---|---|---|---|---|---|
| Ex. | Metal Compd.* | Sand* | Slush-Forming Liquid* | Oxy Phosphorus Compd.* | Sand* | Conditions | Result |
| | | | | soln. | 30 sec at 400 rpm | | |
| 19 | 18.3% MgO (15 m²/g) | 32.7% | 12% glycol | 18.8% aq. Al(H₂PO₄)₃ soln. (c) | 18.2% | mixed 15 sec at 320 rpm | 256 kg/cm |
| 20 | 11.9% Mg(OH)₂ | 28.7% | 9.5% water | 25.0% aq. Al(H₂PO₄)₃ soln. (d) | 25.0% | 61 cm × 2 cm bolt; 300 rpm. 7 meters/min | 259 kg/cm |
| 21 | 14.0% Mg(OH)₂ | 28.0% | 7.7% glycol 2.1% water | 23.7% aq. Al(H₂PO₃)₃ soln. (d) | 24.4% | mixed 15 sec | 348 kg/cm in 10 min |
| 22 | 10.10% MgO | 30.30% | 9.09% water (g) | 20.20% aq. Mg(H₂PO₄)₂ soln. (f) | 30.30% | — | — |

*% content is based on the total weight of the composition
(a) Al₂O₃ 11.5%, P₂O₅ 47.7%, H₂O 40.8%
(b) Al₂O₃ 11.5%, P₂O₅ 46%, H₂O 42.5%
(c) Al₂O₃ 10.9%, P₂O₅ 45.6%, H₂O 43.5%
(d) Al₂O₃ 11.2%, P₂O₅ 45.6%, H₂O 43.2%
(e) Al₂O₃ 11%, P₂O₅ 47%, H₂O 34%, glycol 8%
(f) 42.9 g MgO, 401.0 g H₃PO₄ (85%), 556.1 g H₂O per kg. soln.
(g) Thickened with 1% polyacrylamide In Example 22 the grout was evaluated by a shear strength measurement made by the following method:

A sample of the freshly mixed grout was placed on polyethylene terephthalate film, and a stainless steel ring, 15.9 mm in diameter and 2.92 mm high, was placed on the grout. A piece of polyethylene terephthalate film was placed over the ring, and the latter then was pressed evenly into the grout by means of a block of wood. The resulting "shear button" of the grout was placed on an Instron testing machine (conforming to ASTM Method E4, Verification of Testing Machines), and tested (5 minutes after mixing) for shear strength by the method of ASTM D732. In this test, a plunger was brought down onto the grout at a rate of 12.7 mm per minute. The shear strength was calculated from the applied force to cause failure, according to the following equation:

$$\text{shear strength} = \frac{\text{Force}}{\text{Specimen thickness} \times \pi \times \text{diam. of punch}}$$

The measured shear strength was 90 kg/sq cm.

EXAMPLE 23

A grouting composition was prepared containing 9.0% magnesium oxide (10 m²/g), 14.1% Circosol 450, 52.2% banding sand, 11.8% Al(H₂PO₄)₃ and 12.9% water. The MgO/P₂O₅ molar ratio was 4. When tested as described in Example 7, the hardened grout held a load of 572 kg/cm.

CONTROL EXPERIMENTS

In contrast, a composition containing 8.7% magnesium oxide (10 m²/g), 14.7% Circosol 450, 50.6% banding sand, 13.0% NH₄H₂PO₄, and 13.0% water (MgO/P₂O₅ molar ratio=4.4) held only 45 kg/cm.

When a bolt was embedded into a mixture of 8.7% MgO, 65.3% sand, 13.0% NH₄H₂PO₄, and 13.0% H₂O and tested as described in Example 7, the bolt was dislodged with less than 5 kg. force after 10 minutes.

EXAMPLE 24

The following composition was prepared:
13% MgO (surface area 18.4 m²/g)
56.4% banding sand
12.0% ethylene glycol (in basic component)
18.6% Al(H₂PO₄)₃ solution (10.5% Al₂O₃, 42% P₂O₅)

This grout, tested as described in Example 7, had a pull strength of 672 kg/cm in 5 minutes.

I claim:

1. In a grouting system for use in a hole in combination with a reinforcing member wherein a hardened grout is formed around the reinforcing member in the hole by the reaction of the mixed components of a hardenable inorganic grouting product, thereby anchoring the reinforcing member in the hole, the improvement comprising an inorganic grouting product comprising
    (a) an acidic reactive component comprising at least one acidic oxy phosphorus compound selected from the group consisting of phosphoric acids, anhydrides of phosphoric acids, and salts of phosphoric acids with multivalent metal cations;
    (b) a basic reactive component comprising at least one particulate basic metal compound of a Group II or Group III metal capable of reacting with said oxy phosphorus compound(s) in the presence of water to form a monolithic solid; and
    (c) an aqueous component;

said components being present in or outside a hole in a separated condition such that any substantial hardening reaction between the acidic and basic components is prevented, and when present outside the hole being adapted to be delivered into the hole separately or in a freshly combined condition; said basic metal compound(s) having a particle surface area of up to about 40 square meters per gram and constituting about from 5 to 35 percent of the total weight of said grouting product, with the proviso that when the particles of said basic metal compound(s) have a surface area of less than 1 square meter per gram, more than about 95 percent of said particles pass through a 200 mesh screen; the ratio of the moles of said basic metal compound(s) to the moles of phosphorus pentoxide on which said oxy phosphorus compound(s) are based being in the range of about from 2/1 to 17/1; the amount of water present in said product constituting about from 3 to 20 percent of the total weight of said grouting product; a particulate aggregate being present in said product in an amount such as to constitute about from 30 to 70 percent of the total weight of said product; and the components, when mixed, reacting without the application of heat thereto to form a hardened grout having a pull strength of at least about 175 kilograms per centimeter of anchoring length within an hour.

2. A grouting system of claim 1 wherein said aqueous component and acidic reactive component are combined and maintained separate from said basic reactive component.

3. A grouting system of claim 2 wherein said combination of aqueous and acidic reactive components is an aqueous solution or mixture of phosphoric acid or of an acid salt of phosphoric acid with a multivalent metal cation.

4. A grouting system of claim 2 wherein said basic metal compound is selected from the group consisting of magnesium oxide, aluminum oxide, magnesium hydroxide, ferric hydroxide, aluminum hydroxide, magnesium silicate, magnesium aluminate, and calcium aluminate.

5. A grouting system of claim 1 wherein said basic metal compound is in a substantially dry state.

6. A grouting system of claim 1 wherein said basic reactive component is in the form of a slush with a liquid which is substantially non-reactive with said basic metal compound(s).

7. A grouting system of claims 1, 2, 3, 5, or 6 wherein said basic metal compound is magnesium oxide or hydroxide.

8. A grouting system of claim 7 wherein said basic reactive component additionally contains a hydrated aluminum oxide.

9. A grouting system of claim 3 wherein said salt is an acidic aluminum phosphate.

10. A grouting system of claim 9 wherein said salt is in a supersaturated solution, or partially crystallized therefrom.

11. A grouting system of claim 6 wherein said substantially nonreactive liquid is a hydrocarbon.

12. A grouting system of claim 6 wherein said substantially nonreactive liquid is a polyol.

13. A grouting system of claim 6 wherein said substantially nonreactive liquid is water.

14. A grouting system of claim 2 wherein said combined aqueous and acidic reactive components are maintained in one compartment and said basic reactive component in another compartment of a compartmented frangible package.

15. In a grouting system for use in a hole in combination with a reinforcing member wherein a hardened grout is formed around the reinforcing member in the hole by the reaction of the mixed components of a hardenable inorganic grouting product, thereby anchoring the reinforcing member in the hole, the improvement comprising an inorganic grouting product comprising an aqueous solution of phosphoric acid or of an acidic aluminum phosphate, magnesium oxide or hydroxide separated from said aqueous solution, and sand; said magnesium oxide or hydroxide having a particle surface area of up to about 30 square meters per gram and constituting about from 5 to 35 percent of the total weight of said grouting composition; the ratio of the moles of said magnesium oxide or hydroxide to the moles of phosphorus pentoxide on which said phosphoric acid or phosphate is based being in the range of about from 2/1 to 17/1; the amount of water present in said product constituting about from 3 to 20 percent of the total weight of said grouting product; said sand being present in said product in an amount such as to constitute about from 30 to 70 percent of the total weight of said product; and the magnesium oxide or hydroxide and phosphoric acid or phosphate, when mixed, reacting without the application of heat thereto to form a hardened grout having a pull strength of at least about 175 kilograms per centimeter of anchoring length within ten minutes.

* * * * *